(12) United States Patent
Haupt et al.

(10) Patent No.: US 7,575,511 B2
(45) Date of Patent: Aug. 18, 2009

(54) TEMPERATURE DOOR FOR A VEHICLE AND HEATING, VENTILATION, AND AIR CONDITIONING SYSTEM

(75) Inventors: Eric K. Haupt, Livonia, MI (US); David W. Lumley, Livonia, MI (US); Brent M. Mitrzyk, Northville, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 202 days.

(21) Appl. No.: 11/593,903

(22) Filed: Nov. 7, 2006

(65) Prior Publication Data

US 2008/0108293 A1 May 8, 2008

(51) Int. Cl.
*F28D 7/10* (2006.01)
(52) U.S. Cl. .......................... 454/156; 62/244
(58) Field of Classification Search ................. 454/156, 454/121
See application file for complete search history.

(56) References Cited

U.S. PATENT DOCUMENTS

| | | | |
|---|---|---|---|
| 3,945,432 A | 3/1976 | Tamblyn | |
| 4,290,481 A | 9/1981 | Pohl | |
| 4,725,001 A | 2/1988 | Carrey et al. | |
| 5,553,662 A | 9/1996 | Longardner et al. | |
| 5,755,378 A | 5/1998 | Dage et al. | |
| 5,988,263 A | 11/1999 | Schwarz | |
| 5,988,517 A | 11/1999 | Bauer et al. | |
| 6,059,016 A | 5/2000 | Rafalovich et al. | |
| 6,173,902 B1 | 1/2001 | Bauer et al. | |
| 6,241,604 B1 | 6/2001 | Colter | |
| 6,347,988 B1* | 2/2002 | Kurokawa et al. | 454/121 |
| 6,351,961 B1* | 3/2002 | Kurokawa et al. | 62/244 |
| 6,375,563 B1 | 4/2002 | Colter | |
| 6,478,671 B2 | 11/2002 | Murai et al. | |
| 6,487,525 B1 | 11/2002 | Hall et al. | |
| 6,588,496 B2 | 7/2003 | Nakagawa et al. | |
| 6,668,909 B2 | 12/2003 | Vincent | |
| 6,695,691 B1 | 2/2004 | Le | |
| 6,881,140 B2 | 4/2005 | Le | |
| 6,889,761 B2 | 5/2005 | Perry | |
| 7,063,612 B2 | 6/2006 | Kaszycki | |
| 7,074,122 B2 | 7/2006 | Haupt et al. | |
| 2005/0159097 A1* | 7/2005 | Newman et al. | 454/156 |
| 2005/0257925 A1 | 11/2005 | Koukouravas | |

* cited by examiner

*Primary Examiner*—Steve McAllister
*Assistant Examiner*—Helena Kosanovic
(74) *Attorney, Agent, or Firm*—Fraser Clemens Martin & Miller LLC; J. Douglas Miller

(57) ABSTRACT

A temperature door for air-handling system of a heating, ventilating, and air conditioning system for a vehicle is disclosed, wherein a cost and a weight of the system are minimized and a temperature stratification, a flow efficiency, and a NVH/noise of the system are optimized.

20 Claims, 7 Drawing Sheets

TEMPERATURE DOOR FOR A VEHICLE AND HEATING, VENTILATION, AND AIR CONDITIONING SYSTEM

FIELD OF THE INVENTION

The invention relates to a heating, ventilating, and air conditioning system for a vehicle and more particularly to an air-handling system employing a temperature door to control discharge air temperature and to optimize temperature stratification in the air-handling system.

BACKGROUND OF THE INVENTION

A vehicle typically includes a climate control system which maintains a temperature within a passenger compartment of the vehicle at a comfortable level by providing heating, cooling, and ventilation. Comfort is maintained in the passenger compartment by an integrated system referred to in the art as a heating, ventilating and air conditioning (HVAC) air-handling system. The HVAC air-handling system conditions air flowing therethrough and distributes the conditioned air throughout the passenger compartment.

The design of an HVAC air-handling system includes features that control air flow volume, air temperature, and air flow paths, for example. The performance of the HVAC air-handling system must comply with targets including temperature stratification, wherein stratification is the temperature difference between various outlets of the HVAC air-handling system. For some operating states it is desirable to manipulate hot air streams and cold air streams to produce a stratification between outlets. For other operating states no stratification is desired. The level of desired stratification can fluctuate and design features must allow stratification to be adjustable.

To comply with the desired stratification targets, prior art HVAC air-handling systems include secondary features including baffles, conduits, mixing plates, and/or additional doors to facilitate mixing of the hot air streams with the cold air streams. The addition of these features and/or components can reduce airflow, degrade flow efficiency, increase noise, and increase the cost and weight of the system. Further, many of the prior art systems fail to meet the desired stratification targets.

It would be desirable to produce a temperature control system for an air-handling system of a HVAC system for a vehicle, wherein a cost and a weight of the system are minimized, and airflow, noise, flow efficiency and stratification of the system are optimized.

SUMMARY OF THE INVENTION

Harmonious with the present invention, a temperature control system for an air-handling system of a HVAC system for a vehicle, wherein a cost and a weight of the system are minimized, and airflow, noise, flow efficiency and stratification of the system are optimized, has surprisingly been discovered.

In one embodiment, a temperature door for an air-handling system of a heating, ventilating, and air conditioning system for a vehicle comprises: a first surface; a second surface spaced apart from the first surface; a third surface interposed between the first surface and the second surface, wherein the first surface, the second surface, and the third surface cooperate to cause air to selectively flow between hot and cold paths to control a temperature stratification of the air.

In another embodiment, an air-handling system of a heating, ventilating, and air conditioning system for a vehicle comprises: an air-handling system housing having an inlet in communication with a supply of air and an outlet in communication with a passenger compartment of the vehicle, wherein the air-handling system housing provides for a cold air stream and a hot air stream; and a temperature door pivotally mounted in the air-handling system, the temperature door including a first surface, a second surface spaced apart from the first surface, and a third surface interposed between the first surface and the second surface, wherein the first surface, the second surface, and the third surface cooperate to cause air to selectively flow between hot and cold paths to control a temperature stratification of the air, and wherein the temperature door is variably positionable between a first position and a second position, the first position permitting a flow of air through a first flow path, the second position permitting the flow of air through a second flow path, an intermediate position permitting the flow of air through the first flow path, the second flow path, and a third flow path.

In another embodiment a temperature door for an air-handling system of a heating, ventilating, and air conditioning system for a vehicle comprising: a first surface; a second surface spaced apart from the first surface; a third surface interposed between the first surface and the second surface, wherein the first surface, the second surface, and the third surface cooperate to cause air to selectively flow between hot and cold paths to control a temperature stratification of the air, wherein the temperature door is variably positionable between a first position and a second position, the first position permitting a flow of air through a first flow path, the second position permitting the flow of air through a second flow path, and wherein an intermediate position permits the flow of air through the first flow path, the second flow path, and a third flow path, and wherein the first surface is adapted to sealingly engage one of a first housing wall and a second housing wall and the second surface is adapted to sealingly engage one of the second housing wall and a third housing wall, and wherein the first flow path is formed between the first housing wall and the second housing wall, the second flow path is formed between the second housing wall and the third housing wall, and the third flow path is formed between the third surface and the second housing wall.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
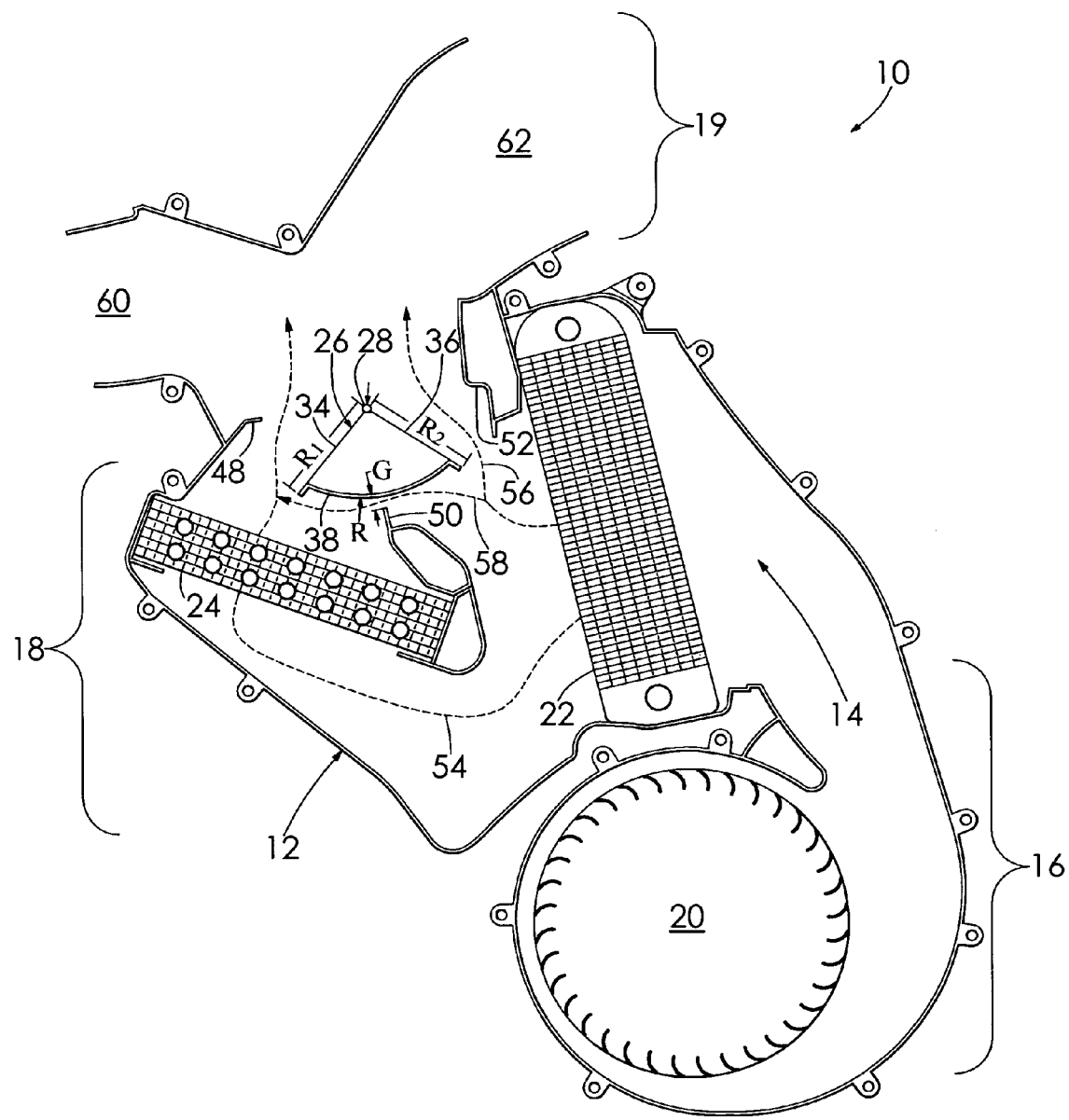
FIG. 1 is a top plan view of a temperature control system for an air-handling system of a heating, ventilating, and air conditioning system for a vehicle according to an embodiment of the invention showing a temperature door and a first housing, wherein the temperature door is in an intermediate air position.

FIG. 1 shows an air-handling system 10 of a heating, ventilating, and air conditioning (HVAC) system or climate control system (not shown) for a vehicle (not shown) according to an embodiment of the invention. As used herein, the term air can refer to fluid in a gaseous state, fluid in a liquid state, or any combination thereof. The air-handling system 10 is also commonly referred to as a HVAC air-handling system in the art. Although the embodiment shown and described is an auxiliary or rear air-handling system, it is understood that the invention can be used with other types of air-handling systems as desired, such as a lateral or "handed", a center mount and a semi-center mount, for example. The air-handling system 10 typically provides heating, ventilation, and air conditioning for a passenger compartment (not shown) of the vehicle. The air-handling system 10 is adapted to be installed between vehicle sheet metal (not shown) and an interior trim panel (not shown). It is understood that the air-handling system 10 can be installed in other locations in the vehicle as desired, such as under an instrument panel, to a dash panel, in a trunk, in a console, under a floor, in a headliner, or in an engine compartment, for example.

The air-handling system 10 includes a first housing 12 and a second housing (not shown). In the embodiment shown, the first housing 12 and the second housing are formed from plastic and interface with each other. It is understood that the housings can be formed from other materials as desired. The first housing 12 and the second housing cooperate to form a hollow main housing with a source air flow conduit 14 formed therein.

The first housing 12 and the second housing include an inlet section 16, a mixing and conditioning section 18, and a delivery section 19. An air inlet aperture 20 is formed in the inlet section 16 and is in fluid communication with a supply of air. If desired, a filter (not shown) can be provided upstream or downstream of the inlet section 16. The supply of air can be provided from outside of the vehicle, recirculated from the passenger compartment of the vehicle, or a mixture of the two, for example. The mixing and conditioning section 18 receives an evaporator core 22, a heater core 24, and a temperature door 26 therein. The evaporator core 22 and the heater core 24 are in communication with a source of cooled fluid (not shown) and a source of heated fluid (not shown) respectively.

Figure 4:
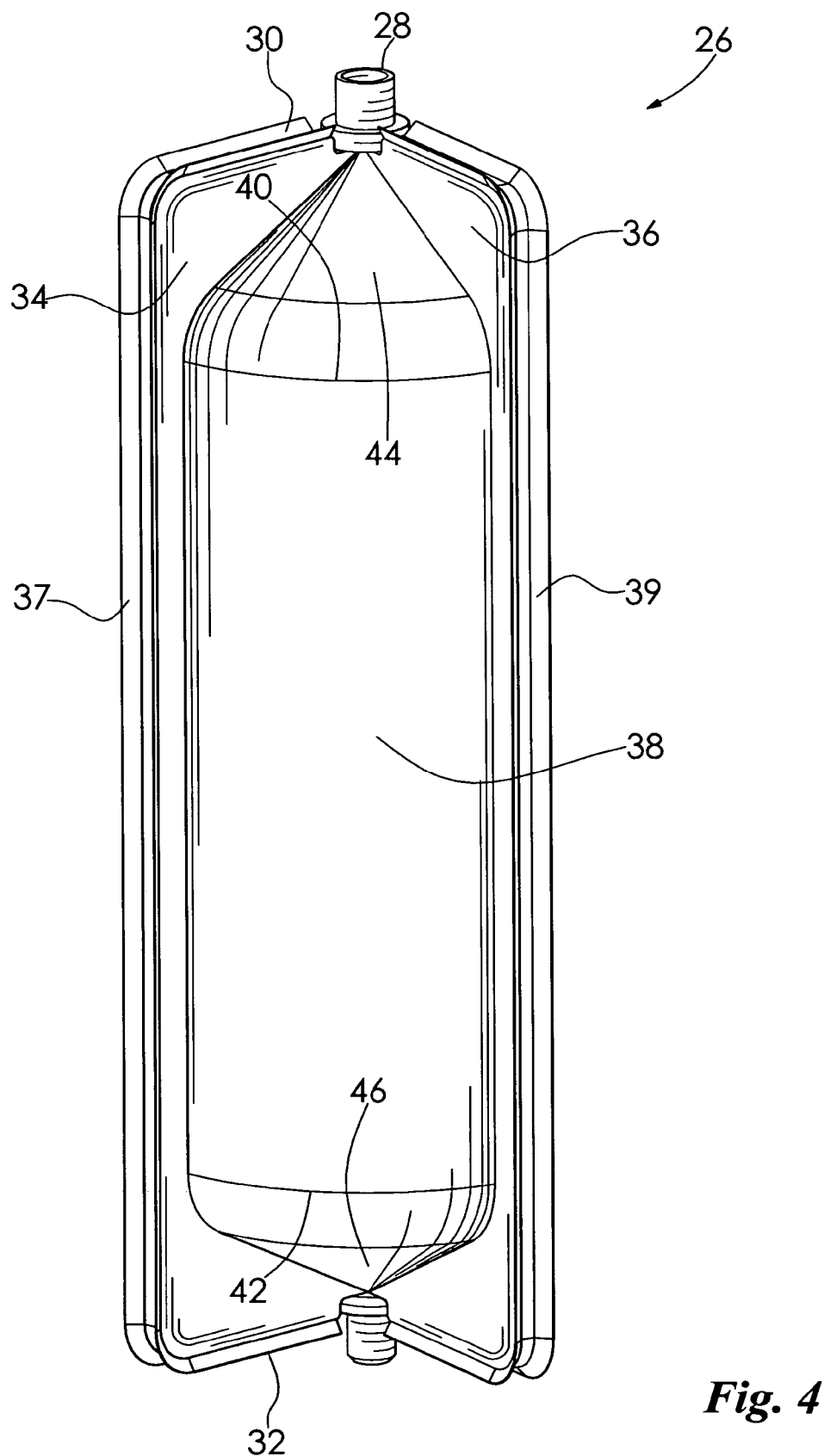
FIG. 4 is a front perspective view of the temperature door illustrated in FIGS. 1-3.
Figure 5:
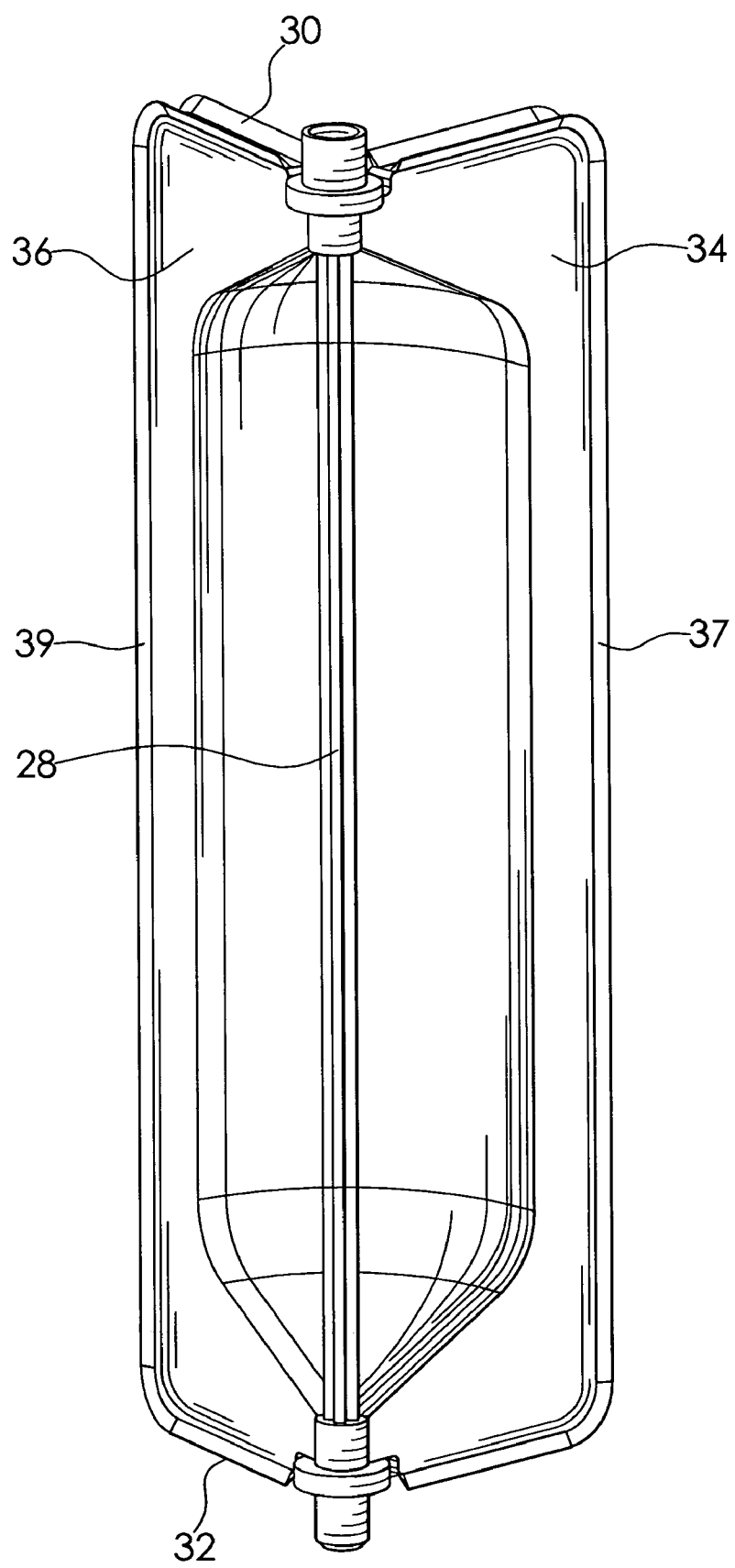
FIG. 5 is a rear perspective view of the temperature door illustrated in FIGS. 1-4.

As more clearly shown in FIGS. 4 and 5, the temperature door 26 is disposed on a shaft 28 that is pivotally disposed in the housing 12. One end of the shaft 28 is received in an aperture (not shown) of the first housing 12 and the other end of the shaft 28 is received in an aperture (not shown) of the second housing. In the embodiment shown, the shaft 28 extends from a first end 30 of the temperature door 26 to a second end 32 of the temperature door 26. The shaft 28 extends outwardly beyond the first end 30 of the temperature door 26 and outwardly beyond the second end 32 of the temperature door 26. It is understood that the shaft 28 can be flush with or recessed from the ends of the temperature door 26. The shaft 28 is adapted to be connected to an actuator mechanism (not shown) such as an electrical positioning motor, for example, for controlling a pivotal position of the temperature door 26. It is understood that the actuator mechanism can be electrically operated, mechanically operated, or fluid operated, for example. It is also understood that the temperature door 26 can be directly connected to the actuator mechanism. In this case, the shaft 28 would not be necessary and could be removed from the temperature door 26.

In the embodiment shown, the temperature door 26 is substantially V-shaped in cross-section. It is understood that other shapes and types of temperature doors 26 can be used as desired. A first leg of the V is formed by a first sealing surface 34 having a surface radius R1. A second leg of the V is formed by a second sealing surface 36 having a surface radius R2. A plane including the first sealing surface 34 and a plane including the second sealing surface 36 intersect at the shaft 28. In the embodiment shown, the first sealing surface 34 and the second sealing surface 36 are disposed at an angle of substantially 90 degrees with respect to one another. However, the first sealing surface 34 and the second sealing surface 36 can be disposed at other angles relative to one another, as desired. The first sealing surface 34 and the second sealing surface 36 may include a sealing lip 37, 39 respectively disposed on peripheral outer edges of the sealing surfaces 34, 36 as shown in FIG. 4. In the embodiment shown, the sealing lips 37, 39 are formed from a thermoplastic, such as a thermoplastic vulcanizate, for example. It is understood that the sealing lips 37, 39 can be formed from other materials as desired. It is also understood that the sealing lips 37, 39 may have other shapes and configurations than shown in FIG. 4.

A third surface 38 extends from the first sealing surface 34 to the second sealing surface 36. In the embodiment shown, a first end 40 of the third surface 38 extends from the first sealing surface 34 to the second sealing surface 36 at a predetermined distance from the first end 30 of the temperature door 26. A second end 42 of the third surface 38 extends from the first sealing surface 34 to the second sealing surface 36 at a predetermined distance from the second end 32 of the temperature door 26. It is understood that the predetermined distances can be substantially similar to each other or can vary from each other without departing from the scope and spirit of the invention. In the embodiment shown, the third surface 38 includes a substantially constant radius R. It is understood that the radius R of the third surface 38 can vary as desired. The radius R shown is less than the radius R1 of the first sealing surface 34 and the radius R2 of the second sealing surface 36. It is understood that any portion of the radius R can be substantially similar to, larger than, or smaller than the surface radius R1 of the first sealing surface 34 and/or the surface radius R2 of the second sealing surface 36 as desired. It is also understood that the radius R can change as a function of its axial location between the first end 40 and the second end 42 at any radial position between the first sealing surface 34 and the second sealing surface 36.

A fourth surface 44 extends from the first end 40 of the third surface 38 of the temperature door 26 to the sealing surfaces 34, 36 and the shaft 28. In the embodiment shown, the fourth surface 44 is substantially planar and is disposed at a predetermined angle from the third surface 38. It is understood that the shape of the fourth surface 44 and the predetermined angle can vary as desired. The fourth surface 44 is substantially wedge shaped and is sealingly engaged with the first sealing surface 34 and the second sealing surface 36.

A fifth surface 46 extends from second end 42 of the third surface 38 of the temperature door 26 to the sealing surfaces 34, second sealing surface 36 and the shaft 28. In the embodiment shown, the fifth surface 46 is substantially planar and is disposed at a predetermined angle from the third surface 38.

It is understood that the shape of the fifth surface 46 and the predetermined angle can vary as desired. The fifth surface 46 is substantially wedge shaped and is sealingly engaged with the first sealing surface 34 and the second sealing surface 36.

The mixing and conditioning section 18 includes a first housing wall 48, a second housing wall 50, and a third housing wall 52. It is understood that the housing walls 48, 50, 52 can be formed integrally with other structure of the mixing and conditioning section 18, or can be formed separately and mounted in the mixing and conditioning section 18.

Figure 2:
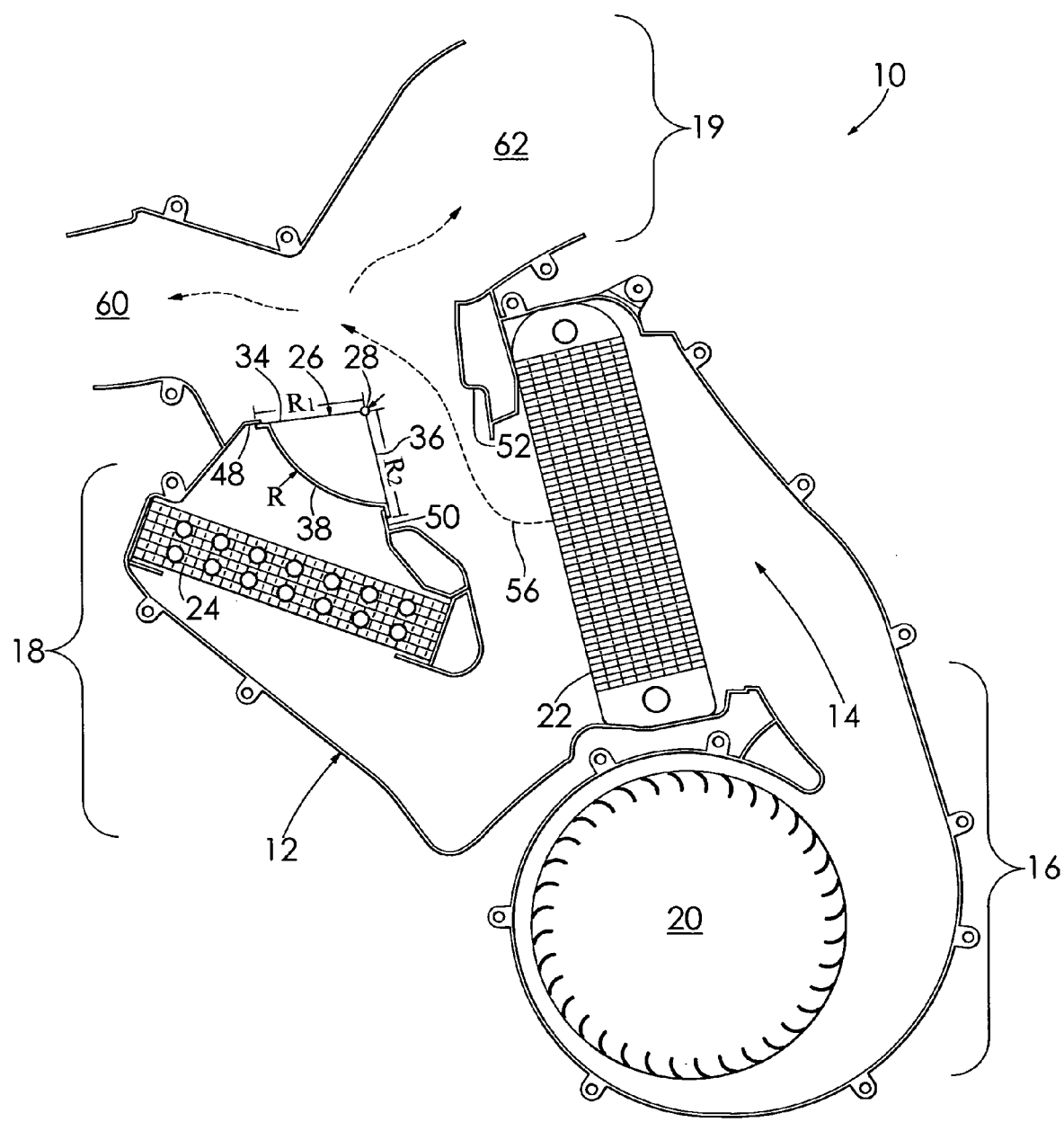
FIG. 2 is a top plan view of the temperature control system of FIG. 1, wherein the temperature door is in a cold air position.

The first housing wall 48 sealingly engages the sealing lip 37 of the temperature door 26 while the system is in a cold air position as shown in FIG. 2. Also, in the cold air position, the second housing wall 50 sealingly engages the sealing lip 39 of the temperature door 26.

Figure 3:
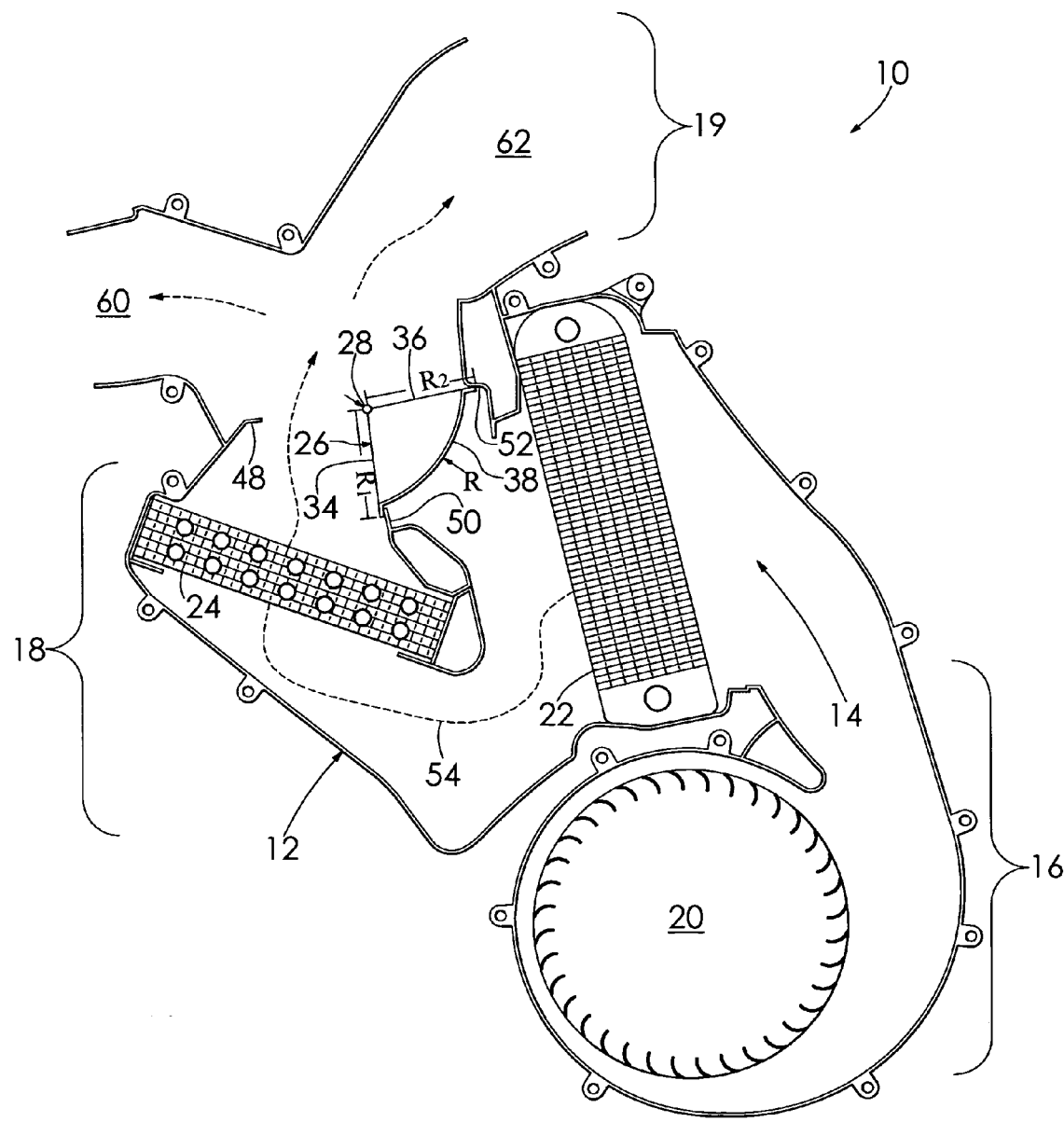
FIG. 3 is a top plan view of the temperature control system of FIG. 1, wherein the temperature door is in a hot air position.

The second housing wall 50 sealingly engages the sealing lip 37 of the temperature door 26 while the system is in a hot air position as shown in FIG. 3. Also in the hot air position, the third housing wall 52 sealingly engages the sealing lip 39 of the temperature door 26.

While the system is in an intermediate air position as shown in FIG. 1, the first sealing surface 34 of the temperature door 26 is positioned between the first housing wall 48 and the second housing wall 50, the second sealing surface 36 of the temperature door 26 is positioned between the second housing wall 50 and the third housing wall 52, and a gap G is formed between the third surface 38 of the temperature door 26 and the second housing wall 50.

A first flow path 54 is formed in the mixing and conditioning section 18 from the evaporator core 22 through the heater core 24 to the delivery section 19. A second flow path 56 is formed in the mixing and conditioning section 18 from the evaporator core 22 to the delivery section 19. A third flow path 58 is formed in the mixing and conditioning section 18 from the evaporator core 22 through the gap G to the delivery section 19. The third flow path 58 provides fluid communication between the first flow path 54 and the second flow path 56 downstream of the heater core 24.

A first delivery conduit 60 and a second delivery conduit 62 are disposed in the delivery section 19. The first delivery conduit 60 and the second delivery conduit 62 supply conditioned air from the first flow path 54, the second flow path 56, and/or the third flow path 58 to the passenger compartment of the vehicle. In the embodiment shown, the first delivery conduit 60 supplies conditioned air to floor outlets (not shown) of the passenger compartment, and the second delivery conduit 62 supplies conditioned air to panel outlets (not shown) of the passenger compartment. It is understood that the delivery conduits 60, 62 can supply conditioned air to other areas of the vehicle as desired. It is also understood that the delivery section 19 may include additional delivery conduits (not shown) as desired.

In operation, the air-handling system 10 conditions air by heating or cooling/dehumidifying the air and providing the conditioned air to the passenger compartment of the vehicle. Air is drawn into the air-handling system 10 through the air inlet aperture 20, flows through the source air flow conduit 14, and into the mixing and conditioning section 18.

The air flows to the evaporator core 22 where the air is cooled and dehumidified by transfer of heat from the air to a fluid (not shown) circulated through the evaporator core 22. The conditioned, cooled air stream then exits the evaporator core 22. The air then flows through the air-handling system 10 according to the position of the temperature door 26.

In an intermediate air position as shown in FIG. 1, the temperature door 26 is positioned to permit the flow of air from the evaporator core 22 to the delivery section 19 through the first flow path 54, the second flow path 56, and the third flow path 58. A first portion of the conditioned, cooled air stream flows directly from the evaporator core 22 into the delivery section 19 along the second flow path 56. It is understood that the amount of air permitted to flow through the second flow path 56 depends on the position of the temperature door 26. As the temperature door 26 approaches the cold air position as shown in FIG. 2, additional air is permitted to flow along the second flow path 56 to the delivery section 19.

A second portion of the conditioned, cooled air stream flows along the first flow path 54 from the evaporator core 22 through the heater core 24 to the delivery section 19. In the heater core 24, the air is heated by transfer of heat from a fluid (not shown) circulated through the heater core 24 to the air. It is understood that the amount of air permitted to flow through the first flow path 54 depends on the position of the temperature door 26. As the temperature door 26 approaches the hot air position as shown in FIG. 3, additional air is permitted to flow along the first flow path 54 to the delivery section 19.

Figure 6:
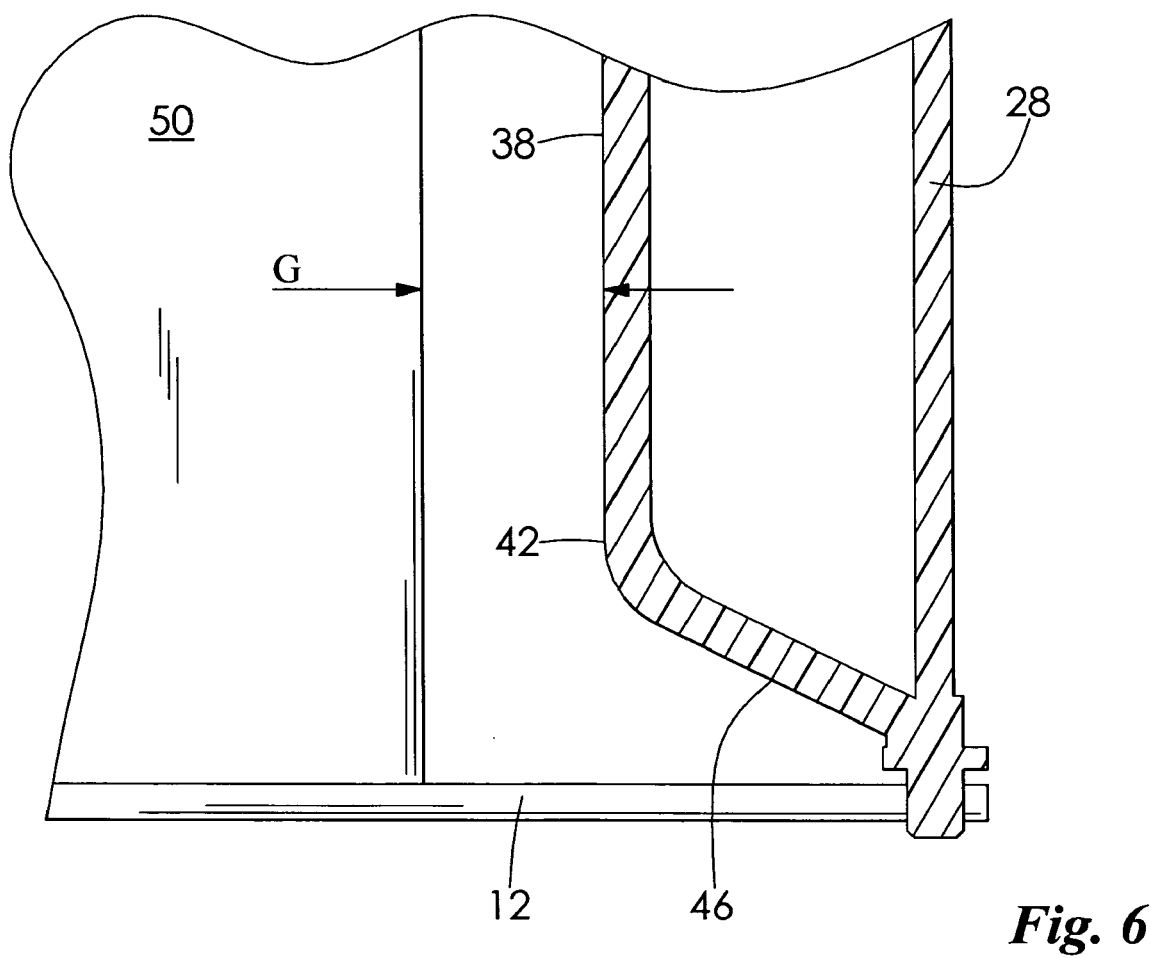
FIG. 6 is a fragmentary sectional view of a second end of the temperature door illustrated in FIGS. 1-5, wherein the temperature door is in an intermediate air position.

A third portion of the conditioned, cooled air stream flows along the third flow path 58. Air flowing along the third flow path 58 is permitted to flow through the gap G, as more clearly shown in FIG. 6. Additional air is permitted to flow along the third flow path 58 adjacent to the fourth surface 44 of the temperature door 26, adjacent to the third surface 38 of the temperature door 26, and adjacent to the fifth surface 46 of the temperature door 26. It is understood that the amount of air permitted to flow along the third flow path 58 can be adjusted by changing the geometry of the third surface 38, the fourth surface 44, and/or the fifth surface 46. Accordingly, the geometry of the temperature door 26 shown in FIGS. 4 and 5 is considered exemplary and is not intended to limit the scope of the invention.

The air flowing along the third flow path 58 is mixed with the air flowing along the first flow path 54 downstream of the heater core 24 and upstream of the delivery section 19. Accordingly, a temperature of the conditioned air stream upstream of the delivery section 19 can be controlled as desired between a maximum temperature equal to the temperature of the air exiting the heater core 24 and a minimum temperature equal to the temperature of the air exiting the evaporator core 22 and flowing along the third flow path 58. If a temperature between the maximum temperature and the minimum temperature is desired, the temperature door 26 is positioned accordingly to permit an appropriate amount of air to flow along the first flow path 54, the second flow path 56, and the third flow path 58.

Once the second portion of the conditioned, cooled/heated air stream and the third portion of the conditioned, cooled air stream are combined, the mixture is caused to flow into the delivery section 19. Once in the delivery section 19, the mixture of the second portion of the conditioned, cooled/heated air stream with the third portion of conditioned, cooled air stream, together with the first portion of the conditioned, cooled air steam, is selectively distributed to the floor outlets through the first delivery conduit 60 and/or to the panel outlets through the second delivery conduit 62 as desired. As is known in the art, this is typically accomplished by use of a mode door (not shown). Additional mode doors (not shown) may be used to control the amount of conditioned air delivered separately to additional outlets (not shown) to the vehicle.

The mixture of the second portion of air and the third portion of air has a tendency to flow to the floor outlets through the first delivery conduit 60, while the first portion of air has a tendency to flow to the panel outlets through the second delivery conduit 62. This is because of the physical location of the portions of air as they enter into the delivery section 19 with respect to the delivery conduits 60, 62, in addition to the differences in velocities and densities of the portions of air. The temperature of the mixture of the second portion of air and the third portion of air is typically higher than the temperature of the first portion of air, since the second portion of air passed through the heater core 24. Accordingly, the temperature of the air flowing through the first delivery conduit 60 to the floor outlets is typically higher than the temperature of the air flowing through the second delivery conduit 62 to the panel outlets.

By mixing an amount of cold air flowing through the third flow path 58 with the hot air flowing through the first flow path 54 downstream of the heater core 24 and upstream of the delivery section 19, the temperature of the mixed air is controlled prior to the mixed air entering the delivery section 19. Thus, a desired temperature of air flowing to the floor outlets and to the panel outlets is controlled, and a desired stratification by the air-handling system 10 can be accomplished.

In a cold air position as shown in FIG. 2, the sealing lip 37 of the temperature door 26 is sealingly engaged with the first housing wall 48, and the sealing lip 39 of the temperature door 26 is sealingly engaged with the second housing wall 50. Accordingly, the flow of air along the first flow path 54 and the third flow path 58 is militated against, while the flow of air along the second flow path 56 is permitted. The conditioned, cooled air stream flows through the second flow path 56 and into the delivery section 19.

The conditioned, cooled air stream is then selectively distributed to the floor outlets through the first delivery conduit 60 and/or to the panel outlets through the second delivery conduit 62 as desired. As is known in the art, this is typically accomplished by use of a mode door (not shown). Additional mode doors (not shown) may be used to control the amount of conditioned air delivered separately to additional outlets (not shown) to the vehicle.

In a hot air position as shown in FIG. 3, the sealing lip 37 of the temperature door 26 is sealingly engaged with the second housing wall 50, and sealing lip 39 of the temperature door 26 is sealingly engaged with the third housing wall 52. Accordingly, the flow of air along the second flow path 56 and the third flow path 58 is militated against, while the flow of air along the first flow path 54 is permitted. The conditioned, cooled air stream flows through the first flow path 54 through the heater core 24 and into the delivery section 19. In the heater core 24, the air is heated by transfer of heat from a fluid (not shown) circulated through the heater core 24.

The heated air stream is then selectively distributed to the floor outlets through the first delivery conduit 60 and/or to the panel outlets through the second delivery conduit 62 as desired. As is known in the art, this is typically accomplished by use of a mode door (not shown). Additional mode doors (not shown) may be used to control the amount of conditioned air delivered separately to additional outlets (not shown) to the vehicle.

The air-handling system 10 described above minimizes or eliminates a need for additional doors, baffles, and/or flow conduits to produce a desired stratification between the floor outlets and the panel outlets. Accordingly, a cost and a weight of the air-handling system 10 are minimized, while stratification, flow efficiency, and NVH/noise thereof are optimized.

Figures 7, 8:
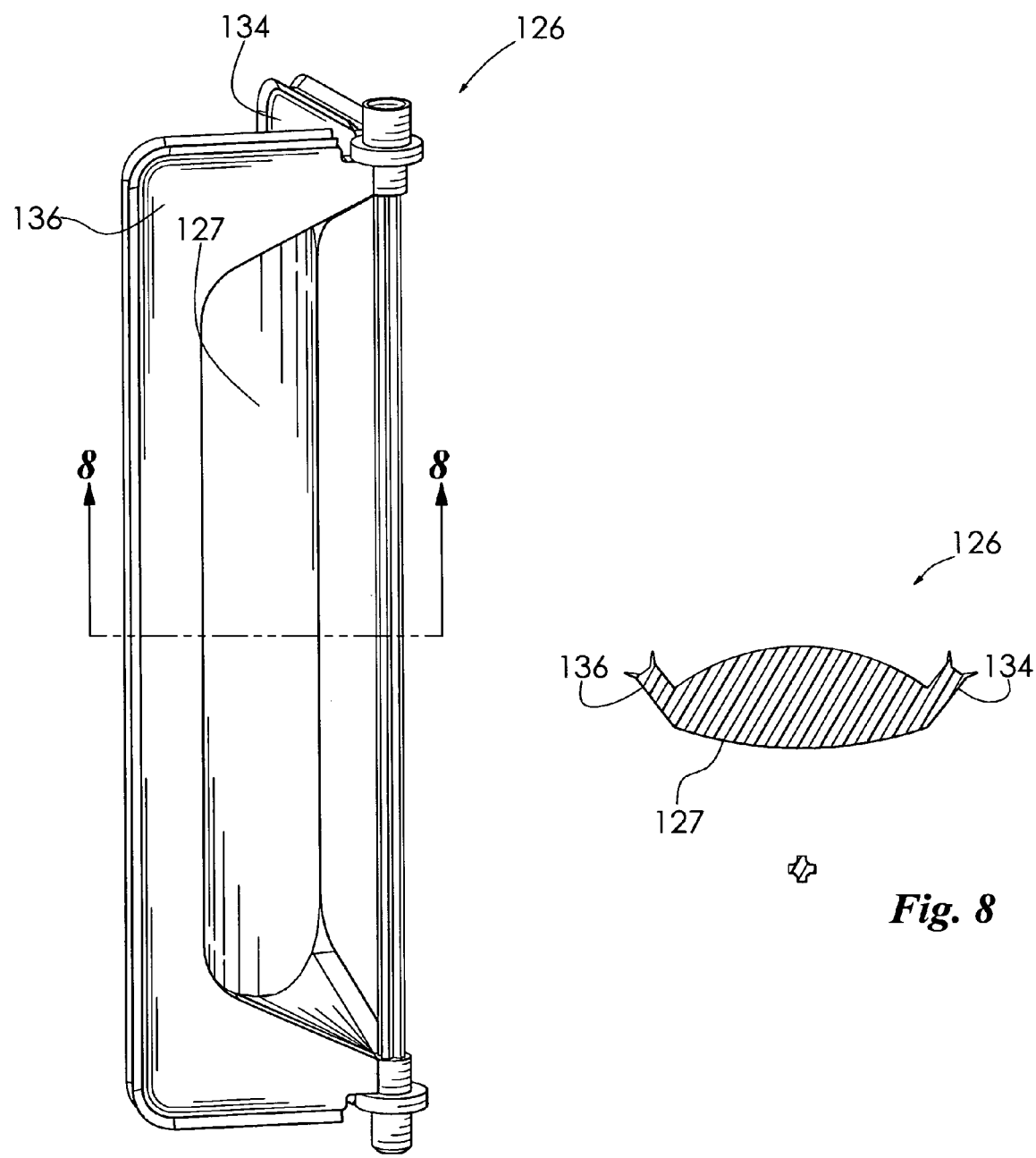
FIG. 7 is a rear perspective view of a temperature door in accordance with another embodiment of the invention.
FIG. 8 is a cross sectional view of the temperature door of FIG. 7 along line 7-7.

FIGS. 7 and 8 show a temperature door 126 for use in an air-handling system (not shown) in accordance with another embodiment of the invention. A front portion (shown in FIG. 8) of the temperature door 126 is substantially similar to the temperature door 26 described above for FIGS. 1-6. A rear portion of the temperature door 126 includes a substantially convex curved surface 127. The substantially convex curved surface 127 extends from a first sealing surface 134 to a second sealing surface 136. The substantially convex curved surface 127 can be formed integrally with the temperature door 126 or can be formed separately from and attached to the temperature door 126. A cross section of the temperature door 126, as shown in FIG. 8, is substantially ovoid shaped. It is understood that the temperature door 126 can have other shapes and configurations as desired.

Operation of an air-handling system (not shown) employing the temperature door 126 is substantially similar to the air-handling system 10 previously described. As air flows adjacent to the substantially convex curved surface 127, turbulence caused by Eddy Effect is minimized. Accordingly, the convex curved surface 127 yields a better streamline of the flow of air, thus further maximizing a flow rate and an efficiency created by the air-handling system. Use of the temperature door 126 further optimizes NVH/noise of the air-handling system.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A temperature door for an air-handling system of a heating, ventilating, and air conditioning system for a vehicle comprising:
    a first surface;
    a second surface spaced apart from the first surface;
    a pivoting structure disposed between and spaced from the first surface and the second surface, the pivoting structure defining an axis, wherein the temperature door is configured to pivot about the axis in a housing of the air-handling system;
    a third surface interposed between the first surface and the second surface, wherein the first surface, the second surface, and the third surface cooperate to cause air to selectively flow between hot and cold paths to control a temperature stratification of the air; and
    a substantially convex curved surface interposed between the first surface and the second surface and spaced from the third surface, wherein the convex curved surface is convex relative to the shaft, and a cross section taken through the third surface and the convex curved surface at any location along substantially the entire length of the temperature door, and at an angle normal to at least one of the third surface and the convex curved surface, is substantially ovoid-shaped, the convex curved surface adapted to minimize turbulence as air flows adjacent thereto.

2. The temperature door according to claim 1, wherein the temperature door is variably positionable between a first position and a second position, the first position permitting a flow of air through a first flow path, the second position permitting the flow of air through a second flow path, and wherein an intermediate position permits the flow of air through the first flow path, the second flow path, and a third flow path, wherein the first surface has a first sealing lip disposed on a peripheral outer edge thereof, and the second surface has a second sealing lip disposed on a peripheral outer edge thereof.

3. The temperature door according to claim 2, wherein the first sealing lip is adapted to sealingly engage one of a first housing wall and a second housing wall and the second sealing lip is adapted to sealingly engage one of the second housing wall and a third housing wall, and wherein the first flow path is formed between the first housing wall and the second housing wall, the second flow path is formed between the second housing wall and the third housing wall, and the third flow path is formed between the third surface and the second housing wall.

4. The temperature door according to claim 2, wherein the at least one of the first sealing lip and the second sealing lip are formed from a thermoplastic material.

5. The temperature door according to claim 1, wherein the temperature door is substantially V-shaped.

6. The temperature door according to claim 1, wherein a radius of the third surface is smaller than a surface radius of the first surface and a surface radius of the second surface.

7. The temperature door according to claim 1, further comprising a shaft disposed between the first surface and the second surface, wherein the shaft is pivotally mounted to a housing of the air-handling system.

8. The temperature door according to claim 1, further comprising a fourth surface extending from the third surface to the first surface and the second surface, and a spaced apart fifth surface extending from the third surface to the first surface and the second surface.

9. An air-handling system of a heating, ventilating, and air conditioning system for a vehicle comprising:
   an air-handling system housing having an inlet in communication with a supply of air and an outlet in communication with a passenger compartment of the vehicle, wherein the air-handling system housing provides for a cold air stream and a hot air stream; and
   a temperature door pivotally mounted in the air-handling system, the temperature door including a first surface, a second surface spaced apart from the first surface, a pivoting structure disposed between and spaced from the first surface and the second surface, the pivoting structure defining an axis, wherein the temperature door is configured to pivot about the axis in the air handling system housing, a third surface interposed between the first surface and the second surface, and a substantially convex curved surface interposed between the first surface and the second surface and spaced from the third surface, wherein the convex curved surface is convex relative to the shaft, and a cross section taken through the third surface and the convex curved surface at any location along substantially the entire length of the temperature door, and at an angle normal to at least one of the third surface and the convex curved surface, is substantially ovoid-shaped, the convex curved surface adapted to minimize turbulence as air flows adjacent thereto, wherein the first surface, the second surface, and the third surface cooperate to cause air to selectively flow between hot and cold paths to control a temperature stratification of the air, and wherein the temperature door is variably positionable between a first position and a second position, the first position permitting a flow of air through a first flow path, the second position permitting the flow of air through a second flow path, an intermediate position permitting the flow of air through the first flow path, the second flow path, and a third flow path.

10. The system according to claim 9, wherein the outlet of the air-handling system housing includes a plurality of outlet openings.

11. The system according to claim 9, wherein the first surface is adapted to sealingly engage one of a first housing wall and a second housing wall, and the second surface is adapted to sealingly engage one of the second housing wall and a third housing wall.

12. The system according to claim 11, wherein the first flow path is formed between the first housing wall and the second housing wall, the second flow path is formed between the second housing wall and the third housing wall, and the third flow path is formed between the third surface and the second housing wall.

13. The system according to claim 9, wherein the pivoting structure is a shaft disposed between the first surface and the second surface, wherein the shaft is pivotally mounted to the air-handling system housing.

14. The system according to claim 9, wherein the temperature door includes a fourth surface extending from the third surface to the first surface and the second surface.

15. The system according to claim 14, wherein the temperature door includes a spaced apart fifth surface extending from the third surface to the first surface and the second surface.

16. The temperature door according to claim 15, wherein an amount of air permitted to flow through the third flow path is adjustable by varying at least one of the first surface, the second surface, the third surface, the fourth surface, and the fifth surface.

17. A temperature door for an air-handling system of a heating, ventilating, and air conditioning system for a vehicle comprising:
   a first surface;
   a second surface spaced apart from the first surface;
   a pivoting structure disposed between and spaced from the first surface and the second surface, the pivoting structure defining an axis, wherein the temperature door is configured to pivot about the axis in a housing of the air-handling system:
   a third surface interposed between the first surface and the second surface; and
   a substantially convex curved surface interposed between the first surface and the second surface and spaced from the third surface, wherein the convex curved surface is convex relative to the shaft, and a cross section taken through the third surface and the convex curved surface at any location along substantially the entire length of the temperature door, and at an angle normal to at least one of the third surface and the convex curved surface, is substantially ovoid-shaped, the convex curved surface adapted to minimize turbulence as air flows adjacent thereto, wherein the first surface, the second surface, and the third surface cooperate to cause air to selectively flow between hot and cold paths to control a temperature stratification of the air, wherein the temperature door is variably positionable between a first position and a second position, the first position permitting a flow of air through a first flow path, the second position permitting the flow of air through a second flow path, and wherein an intermediate position permits the flow of air through the first flow path, the second flow path, and a third flow path, and wherein the first surface is adapted to sealingly engage one of a first housing wall and a second housing wall and the second surface is adapted to sealingly engage one of the second housing wall and a third housing wall, and wherein the first flow path is formed between the first housing wall and the second housing wall, the second flow path is formed between the second housing wall and the third housing wall, and the third flow path is formed between the third surface and the second housing wall.

18. The temperature door according to claim 17, wherein the temperature door is pivotally mounted to a housing to pivot between the first position and the second position.

19. The temperature door according to claim 17, wherein a radius of the third surface is smaller than a surface radius of the first surface and a surface radius of the second surface.

20. The temperature door according to claim 17, further comprising at least one of a fourth surface and a fifth surface, the fourth surface extending from the third surface to the first surface and the second surface, the fifth surface extending from the third surface to the first surface and the second surface.

* * * * *